(No Model.)  3 Sheets—Sheet 1.

A. W. WILKINSON.
PROCESS OF AND APPARATUS FOR MANUFACTURING HEATING GAS.

No. 348,178. Patented Aug. 24, 1886.

Witnesses
Inventor
A. W. Wilkinson (No Model.)

A. W. WILKINSON.

PROCESS OF AND APPARATUS FOR MANUFACTURING HEATING GAS.

No. 348,178. Patented Aug. 24, 1886.

Witnesses
W. C. Earle
W. H. Guitte

Inventor
Asa. W. Wilkinson (No Model.) 3 Sheets—Sheet 3.
A. W. WILKINSON.
PROCESS OF AND APPARATUS FOR MANUFACTURING HEATING GAS.
No. 348,178. Patented Aug. 24, 1886.
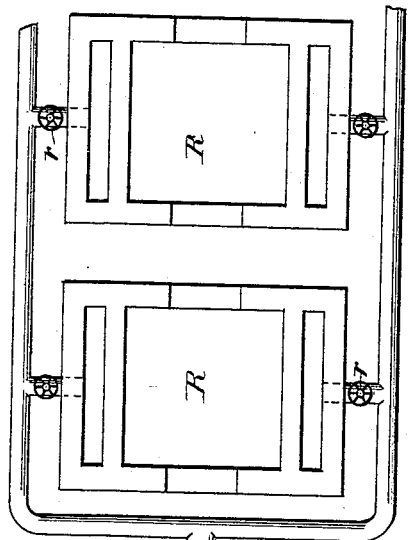
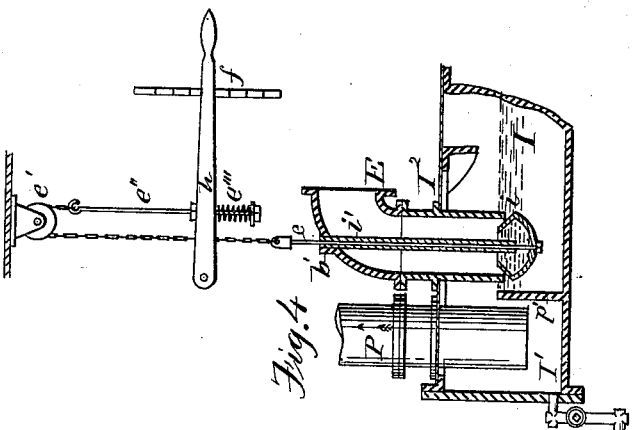
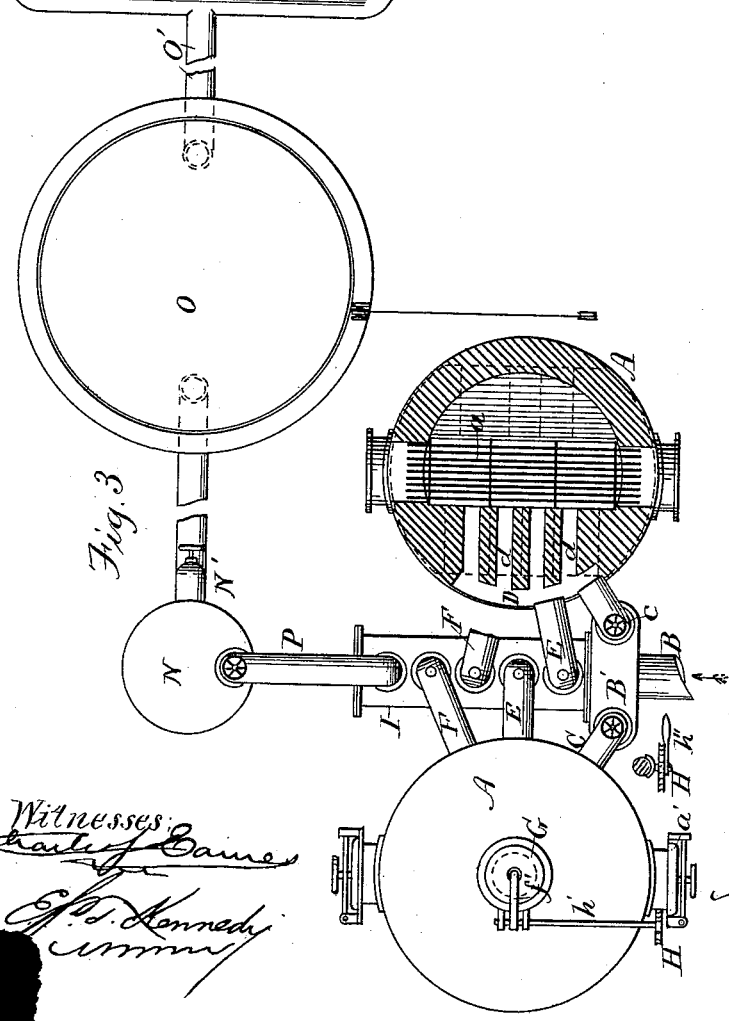
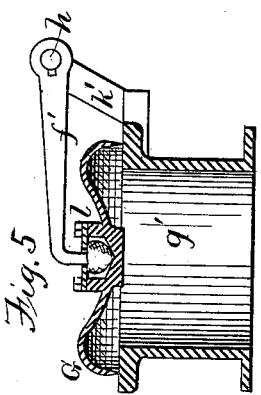
Witnesses:
Inventor
A. W. Wilkinson
N. PETERS, Photo-Lithographer, Washington, D. C.

UNITED STATES PATENT OFFICE.

ASA W. WILKINSON, OF NEW YORK, N. Y., ASSIGNOR OF ONE-HALF TO EDWARD S. T. KENNEDY, OF SAME PLACE.

PROCESS OF AND APPARATUS FOR MANUFACTURING HEATING-GAS.

SPECIFICATION forming part of Letters Patent No. 348,178, dated August 24, 1886.

Application filed April 24, 1886. Serial No. 200,076. (No model.)

*To all whom it may concern:*

Be it known that I, ASA W. WILKINSON, a citizen of the United States, and a resident of the city, county, and State of New York, have invented new and useful Improvements in Process of and Apparatus for Manufacturing Heating-Gas, of which the following is a specification.

This invention relates to an improved process and apparatus for manufacturing heating and motive-power gas, suitable for use in the industrial arts, such as metallurgy, pottery and glassware manufacture, and other arts, wherever heating-gas can be advantageously applied.

The important advantages arising from the use of gas in the industrial arts, independent of the economy in the fuel account, have been abundantly demonstrated in the natural-gas regions, and these demonstrated advantages have given rise to a very general demand for a cheap and efficient heating-gas, whereby the industrial arts may be successfully carried on in all parts of the country.

It is the object of my invention to provide the means for supplying such a gas, which shall be under convenient control as to quality, quantity, and pressure, so that manufacturers may obtain the kind of flame desired, and have a constant and steady supply of fuel, and thus be enabled to successfully compete with those using natural gas.

Special objects of my invention are, to produce water-gas, practically free from carbonic acid, directly in the generating-cupola; to conduct the operation in such manner as to protect the cupola and take off pipe from the destructive action of excessive heat, and at the same time utilize heat that would otherwise be wasted and injurious; to provide efficient means to prevent injury and loss by explosions in the cupola and its connecting-pipes, and to provide means for readily operating the valves and protecting them from heat. With these objects in view, I construct and operate my apparatus as below described, with reference to the accompanying drawings, in which—

Figure 1:
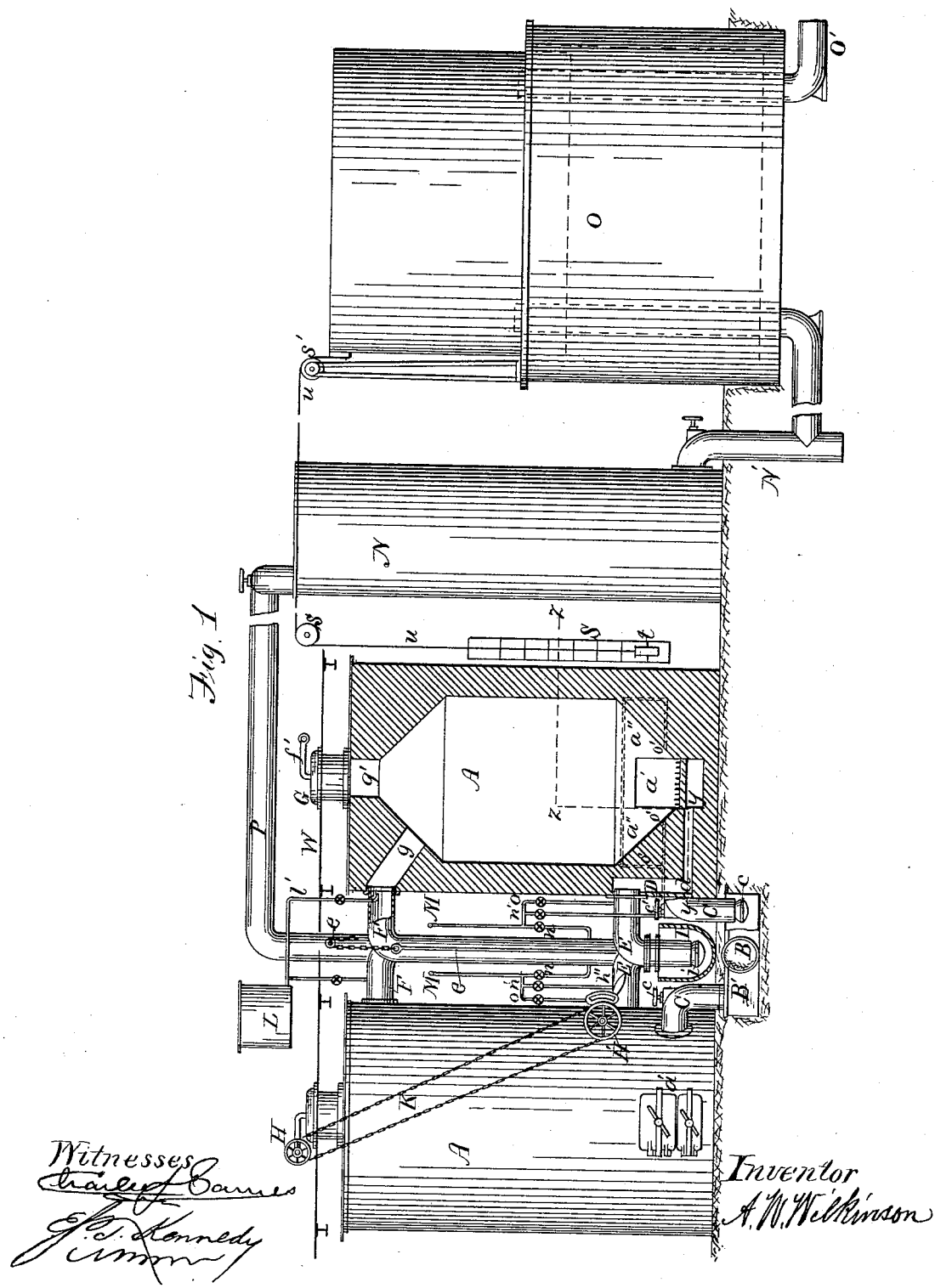
Figure 2:
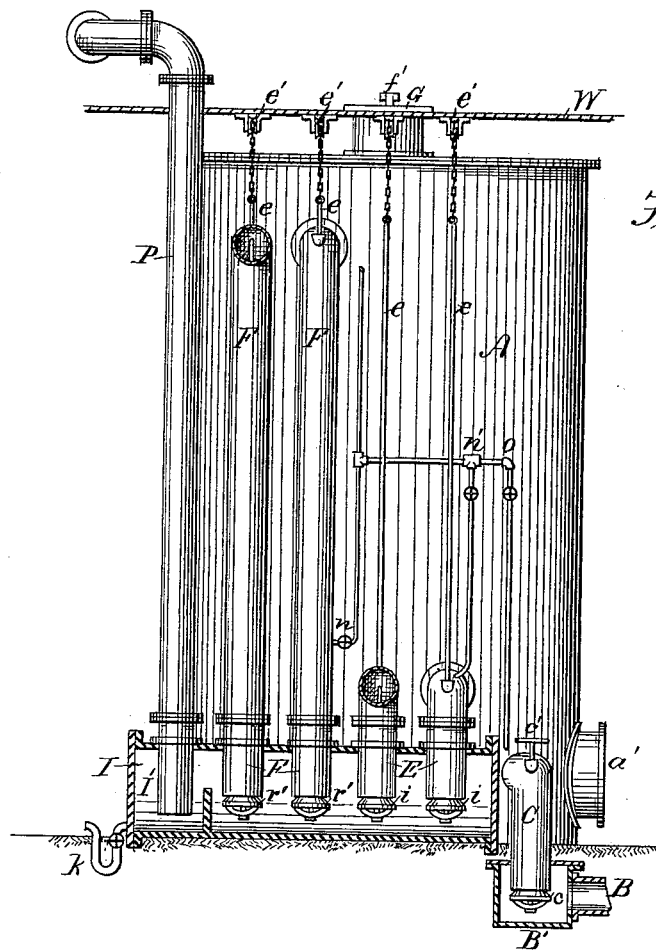

Figure 1 represents the apparatus, partly in front elevation and partly in vertical section. Fig. 2 represents a side elevation of one of the cupola-generators, with the take-off pipes and hydraulic main, partly in section. Fig. 3 represents a plan view of the apparatus, partly in horizontal section on lines $y\,y$ and $z\,z$. Fig. 4 represents a sectional detail of the hydraulic main, connecting-pipe, and valve mechanism. Fig. 5 represents a sectional view of the mouth-piece or neck and closing-lid at the top of the cupola.

The generating-cupolas, A, are preferably constructed in pairs, connecting with the same hydraulic main, as shown in Fig. 1, so that one man can conveniently operate the air, steam, and gas valves of both; but either cupola may be separately and independently operated.

The cupolas being constructed alike, a description of one will serve for both. The walls are built of brick and lined with fire-brick, and inclosed in a tight jacket of riveted plate-iron, in the usual manner. The walls are drawn in or inclined, as shown at $a''$, near the base, from the sides down to the central grate $a$, so as to support the fuel and limit the grate-surface. They are also drawn in at the top, from the sides up to the central neck or mouth-piece, $g'$, which serves for the escape of products of combustion up into a funnel and smoke-stack, and also for charging the generator with fuel. A chamber, D, and blast-ports $d$ are formed in the brick-work at the base, the ports leading into the ash-pits $b\,b$, below the grate. Air-pipe C, leading from air-box B', connects with chamber D. The main air-blast pipe B, conducting air from a positive pressure-blower, (not shown,) supplies box B' for both cupolas. In practice the main blast-pipe B is provided with a blow-off pipe having an adjusted relief-valve, so that an excessive quantity of air rising above the desired pressure is allowed to escape. This is an important feature, since the blower is kept running continuously, while the application of air-blast to the fuel is intermittent. Pipe C is provided at its lower end, in box B', with a conical valve, $c$, which has a screw-threaded operating-rod projecting up through a boss at the top of the pipe, where the rod is provided with a hand-wheel, $c'$. Gas-take-off pipe E connects with chamber D, and extends in the form of a dip-pipe down into hydraulic main I. An inclined passage, g, for the upper gas-take-off pipes is preferably formed in the brick-work, so that the iron pipe at its connection is protected from excessive heat. Pipe F connects with passage g and extends down into main I. Two gas-take-off pipes—one from the top and one from the bottom of each cupola—lead into the hydraulic main, and the four pipes are provided at their lower ends with valves which have operating mechanism, such as shown in Fig. 4. A valve, i, made in the form of a cup or pot and having an upper annular beveled or conical bearing-surface, is located in the hydraulic main just below the water-line, which rises to the top of partition $p'$, and is suspended centrally by rod e just below the end of the gas-pipe, which projects slightly below the water-line, as shown, so that when the valve is open the outflowing gas encounters little or no resistance. The valve is loosely secured to rod e, so as to readily accommodate itself to its seat. The guide and seal tube $i'$, inclosing rod e, is secured in a boss, $b'$, and extends down into the valve-cup, where it is sealed by the liquid contained therein, so that no gas can escape through it. Rod e is connected at top by a chain which passes over pulley $e'$ and connects with rod $e''$, which passes through a hole or slot in lever h, and is provided with nuts above and below the lever and with a spiral bearing-spring between the lower nut and lever. The lever is pivoted so that when its free end is forced down the valve is raised to its seat, and the lever is secured in its depressed position by means of the toothed rack-bar f, thus holding the valve to its seat. When the free outer end of the lever is released, the valve immediately drops from its seat and opens the pipe. These valves, constructed, arranged, and connected as described, are very advantageous in the practical operation of the apparatus, since they are fully protected from injury by heat, and from the accumulation of hard tarry matter upon them and their seats, so that they do not stick, and they are very quickly shifted to close or open the pipes. The water or other sealing-fluid flowing over partition $p'$ into compartment $I'$ is conducted away by the trap or seal pipe k, unless it is desired to close outlet-pipe P, and shut off communication between the main and holder. When this is desired, the valve on trap-pipe k is closed, and the water rises in compartment $I'$ and seals the end of pipe P.

The top $I^2$ of the hydraulic main is made of flexible sheet or plate metal, so as to permit expansion and contraction of the long pipes F without injury to connecting parts.

The main steam-pipe M supplies the three branch pipes n, $n'$, and o, and pipe n connects with gas-take-off pipe F. Pipe $n'$ connects with steam superheating and discharge pipes $o'$ in the brick-work at the base of the cupola, and pipe o connects with air-pipe E. These pipes are provided with valves for controlling the flow of steam either into the base or top of the cupola, either for decomposition or for use in purging the fuel-chamber and connecting-flues, as set forth in the description of the operation.

An oil-supply pipe, $l'$, leading from tank L, and having a valve, connects by an inwardly-bent nozzle with the interior of pipe F for supplying oil to the top of the fuel, to be decomposed with steam by passage down through the fuel. The neck or mouth-piece $g'$ at the top is closed by a light thin cast or wrought metal lid, G, of the ogee form, as shown in Fig. 5. The cover is centrally hung by a ball-and-socket joint to the lever-arm f, the ball of the arm being loosely held in the socket or recess in the thickened central portion of the lid by a plate, l, which is screwed to the lid. Lever-arm $f'$ is keyed to shaft $h'$, supported by lugs k, and shaft $h'$ carries on its outer end a sprocket-wheel, H, of comparatively small diameter. A second sprocket-wheel of larger diameter is mounted on a spindle projecting from a bracket near the base of the cupola, and this wheel is provided with a lever-arm, $h''$, which may be secured in any desired position by a screw-threaded pin projecting through a slot in a sector-shaped guide-bar, and having a handled nut. A suitable chain, K, connects the sprocket-wheels, so that a part-turn of the wheel $H'$ throws lid G open, and another part-turn in the opposite direction closes it upon the upper ground face of neck $g'$. The lid is then held to its seat by locking-lever arm $h''$ to the sector-shaped guide-bar. The sharp edge of the lid makes a tight joint by contact with the ground face of neck $g'$, and expansion of the lid by heat, when it is held to its seat by the means above described, causes it to be forced more tightly to its seat, so that leakage of gas is prevented.

Doors $a'$, for access to the ash-pit and grate, are provided at the base of the cupola. A working and fuel floor, W, extends above the cupolas. Pipe P, leading from the hydraulic main, connects with the scrubber N, and pipe $N'$ connects the scrubber with the governing-holder O.

It is designed to use a comparatively small holder, and to operate the cupolas according to the supply of gas required. For this purpose an index or tell-tale is placed adjacent to the cupolas. This index consists of a scale-board, S, a weighted pointer, t, and a rope or chain passing over pulleys s $s'$, and connecting with the bell of the holder. This informs the cupola-man of the rate of consumption of gas, and he readily controls the production accordingly.

The ease with which my cupolas are managed makes the use of large and expensive holders unnecessary, especially where the gas is used in manufacturing-works, as there the variations in the required gas-supply are approximately known. Pipes $O'$ and r conduct gas from the holder to the metallurgical or other furnaces, R, where it is used as a fuel.

Having described my improved apparatus,

I will now describe its operation, which is as follows: A fire is kindled on the grate with wood, and coal is gradually supplied while the ash-pit door and lid G are open. Then, as a sufficient body of fuel accumulates, the lower doors are closed and the air-blast is admitted by pipe E, and continued till the fuel is heated to incandescence; then air-pipe valve c is closed, steam is admitted by pipe o to purge chamber D and ash-pit b of air; then in a moment the valve r' of pipe F is opened, lid G is closed and secured, and steam is passed for a short time through chamber D and ash-pit b, and up through the grate into the fuel, where it is decomposed, and the resulting gas is conducted by pipe F to the hydraulic main. The steam thus admitted is superheated in passages d, and cools the grate, and the resulting gas heats the upper part of the cupola and pipe F. After the passage of steam for about five minutes, as described, the valve of pipe o is closed, shutting steam off from the ash-pit, valve i of pipe E is opened, valve r of pipe F is closed, and steam is admitted by pipe n to pipe F, where it is superheated, taking up waste heat of the pipe and at the top of the cupola, and then is decomposed by passage down through the fuel, and the resulting gas is conducted to the main by take-off pipe E, at the base of the cupola. The operation is thus continued till the fuel again requires to be blasted with air. Then the take-off pipe valves are closed, the lid is opened, steam is momentarily admitted to the ash-pit to purge it of gas, so as to prevent explosion, then steam is shut off and the air-blast is admitted by opening valve c. When not using steam for purging chamber D and the ash-pit, it is preferably admitted to the base of the cupola by pipe n' and the coil and ports o' in the brick-work. In case the last operation of making gas was by passing steam up through the fuel and conducting away the gas by take-off pipe F, leading from the top of the cupola. Then before admitting the air-blast for reviving the fuel the lid is slightly opened to afford a vent, and steam is momentarily admitted to pipe F, to drive the gas out of it and the top of the cupola to prevent explosion by access of air when the lid is thrown fully open. After a deep body of fuel is raised to incandescence throughout, and as sometimes occurs, the upper part of the fuel and upper part of the cupola become the hottest, steam is passed downward during the whole or greater part of a run, or of several successive runs. By passing steam downward the heat, which would not only go to waste, but act destructively in the upper part of the cupola and take-off pipe and mouth-piece, is utilized in superheating steam; and besides, by conducting the operation in this manner, the fire is not deadened or extinguished on and just above the grate, and may therefore be readily ignited and revived by the air-blast. It is to be understood that, as a rule, steam is passed both up and down during a run—that is, during the period in which gas is made—between the periods of admitting the air-blast for heating the fuel to the proper temperature.

If a heating-gas containing an increased volume or per cent. of carbureted hydrogen is required, hydrocarbon oil is admitted with steam into the top of the cupola, the oil being admitted by pipe l' and its bent nozzle into pipe F, while steam is admitted at a lower point in the pipe, and, passing upward, catches the inflowing oil, and carries it in the form of vapor into contact with the heated fuel, where both are decomposed by passage downward. Gas having a greater heating power and producing a deoxidizing flame can thus be readily produced in the same apparatus with very little additional expense.

The pot-valves in the hydraulic main, in addition to other advantages, prevent air (when the blast is on) from flowing back from chamber D, through the gas-take-off pipe, into the hydraulic main. The sleeve or tube inclosing the valve-rod answers much better in this position than a packing-box for the rod to work through, since the packing in such box would be injuriously dried by the heat, causing the rod to stick, and allowing gas to leak, while with the sleeve there is nothing to get out of order, and its lower end being always sealed in the liquid of the main or pot-valve no gas can escape through, and the rod always works in it with perfect freedom.

Celerity and certainty of action of the working parts of the apparatus are secured by the construction shown and above described. My improved construction and arrangement of parts is therefore quite advantageous in practical operations.

Having described my invention, what I claim, and desire to secure by Letters Patent, is—

1. The process of manufacturing gas which consists in blasting a body of fuel with air till it is heated to incandescence, then shutting off the air and passing steam through the fuel, first in one direction, then in the other, during the run, whereby excessive heat is taken up by the steam, which is thus superheated, and both ends of the cupola and its connections are protected from injury by heat.

2. The process of manufacturing gas which consists in heating a body of fuel to incandescence by an air-blast, then momentarily admitting steam to drive out the air and nitrogenous products, then closing the top lid, opening the valve of the upper take-off pipe, and then admitting steam at the base of the cupola and causing its decomposition by passage up through the fuel during about half the run, then reversing the flow of steam and gas by closing the lower steam-valve, opening the valve of the lower gas-take-off pipe, closing the valve of the upper gas-take-off pipe and admitting steam to such upper take-off pipe a short distance above its valve in the hydraulic main, so as to superheat the steam in such take-off pipe and top of the cupola, and causing its decomposition by passage down through the fuel, whereby the lower portion is left comparatively hot, so that it may be readily ignited upon readmission of the air-blast.

3. The process of conducting the operation of making gas in a cupola, which consists in purging it of gas at the end of a run, either at top or bottom, as required, by slightly opening the lid for a vent and then momentarily admitting steam to drive out the gas, then opening the lid and admitting the air-blast till the fuel is properly heated, then momentarily admitting steam to purge the interior of the cupola of air or nitrogenous products, then closing the lid and opening one of the gas-outlet valves and admitting steam for again manufacturing gas till the end of the run, and then repeating the above steps of the operation.

4. In combination with a gas-generating cupola, an upper and a lower gas-take-off pipe connecting opposite ends of the cupola with a single hydraulic main, for the purpose described.

5. In connection with a gas-generating cupola, the combination, with the gas-take-off pipe, which projects down into a hydraulic main, of a pot or cup valve having an annular beveled bearing-surface at the top and arranged in the fluid of the main, so as to close the lower end of the gas-pipe, and means for operating the valve.

6. In combination with a gas-generator, a gas-take-off pipe projecting down into the hydraulic main, a pot or cup valve arranged in the fluid of the main, a valve-rod projecting through the pipe, and a sleeve or tube inclosing the rod and projecting into the valve-cup, so as to be sealed by the fluid therein, as described.

7. In combination with a gas-generator, a hydraulic main having a bridge or partition rising from its bottom, a gas-take-off pipe connecting the generator with the main on one side of the partition, an outlet-pipe for conducting gas from the main, projecting down upon the other side of the partition and below its top, and a valved fluid-discharge pipe, whereby the gas-outlet pipe may be sealed with liquid or unsealed, as desired.

8. The combination of a cupola, an upper and a lower gas-take-off pipe, both projecting into the same hydraulic main, and each provided at its lower end with a valve arranged in the liquid of the main, and means for operating the valves, as and for the purpose described.

9. In combination with a gas-generating cupola, an upper and a lower gas-take-off pipe, each provided with a valve, a steam-supply pipe connecting with the base of the cupola, and a steam-supply pipe connecting with the upper take-off pipe above its valve, as and for the purpose described.

10. In combination with a gas-generating cupola, an upper and a lower gas-take-off pipe, each provided with a valve, a steam-supply pipe and an oil-supply pipe connecting with the upper take-off pipe above its valve, as and for the purpose described.

11. A cupola gas-generator having a chamber, D, and ports d, connecting it with the ash-pit, in combination with an air-blast pipe and a gas-take-off pipe, both connecting with chamber D, and each having a valve, for the purpose described.

12. A cupola gas-generator having the gas-take-off pipes, the air-blast pipe, the steam-supply pipes, and the controlling-valves of such pipes, also the mechanism for operating the lid of the cupola, all arranged at one side thereof, whereby the cupola may be blasted, purged, and the flow of steam into and gas therefrom is controlled at one point by a single operator, as described, so that the parts may be quickly manipulated and explosion prevented.

13. In combination with the mouth-piece of the cupola, a thin metal lid having ogee curved form, and mechanism for operating such lid, consisting of a lever, shaft, and sprocket-wheel at the top, a sprocket-wheel below, a connecting-chain, and a locking device for the lower wheel, whereby the lid may be held closed when desired.

14. The combination of the cupola with a governing-holder and an indicating device adjacent to the cupola, consisting of a graduated scale, S, a weighted pointer, a cord or chain connecting it with the holder and pulleys, as described.

15. The combination of the cupola with the hydraulic main, having a flexible metal top and a gas-take-off pipe connecting the cupola with the main through such flexible top, so that expansion and contraction of the pipe may take place without strain or breaking of parts, as described.

In testimony that I claim the foregoing as my invention I have signed my name, in presence of two witnesses, this 10th day of April, 1886.

ASA W. WILKINSON.

Witnesses:
CHARLES J. EAMES,
E. S. T. KENNEDY.